E. J. PRINDLE.
INTERCHANGEABLE KEY LOCK.
APPLICATION FILED JAN. 25, 1908.
972,241.
Patented Oct. 11, 1910.
3 SHEETS—SHEET 1.
FIG: 1
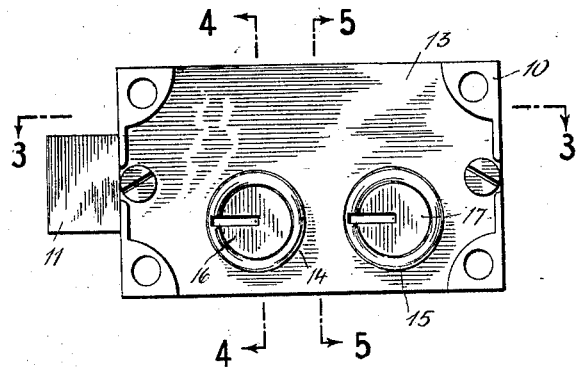
FIG: 2
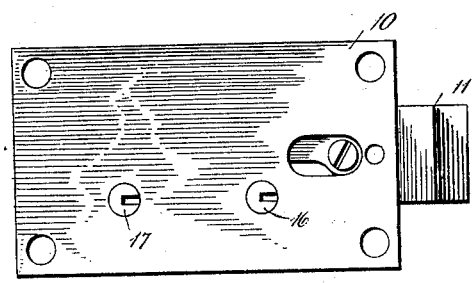
FIG: 3
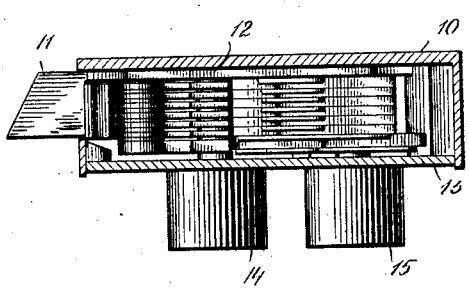
FIG: 4
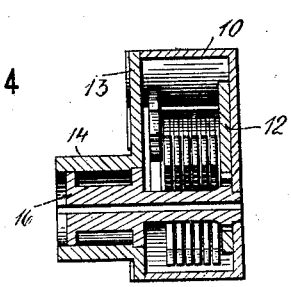
FIG: 5
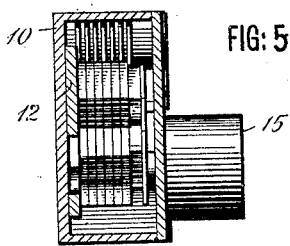
Witnesses:
Inventor
Edwin J. Prindle,
By his Attorneys
Prindle and Williamson
THE NORRIS PETERS CO., WASHINGTON, D. C.

E. J. PRINDLE.
INTERCHANGEABLE KEY LOCK.
APPLICATION FILED JAN. 25, 1908.
972,241.
Patented Oct. 11, 1910.
3 SHEETS—SHEET 2.
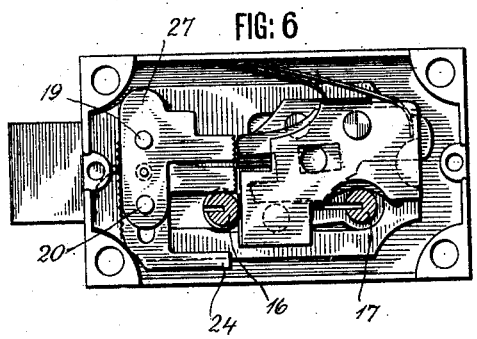
FIG: 6
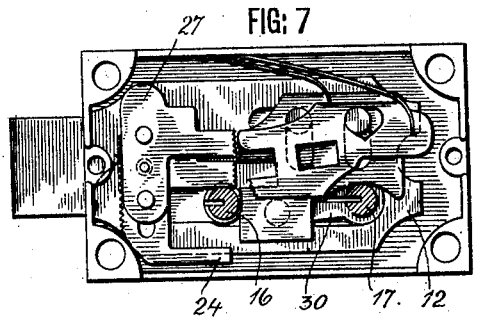
FIG: 7
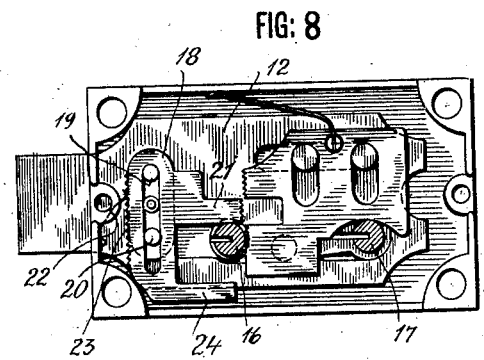
FIG: 8
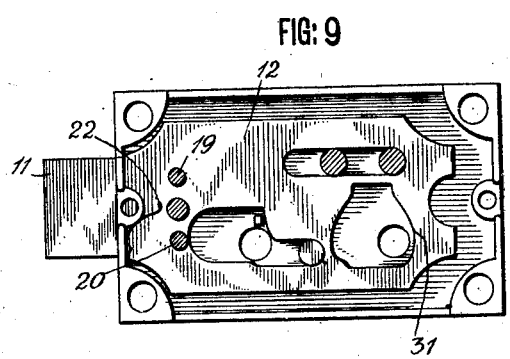
FIG: 9
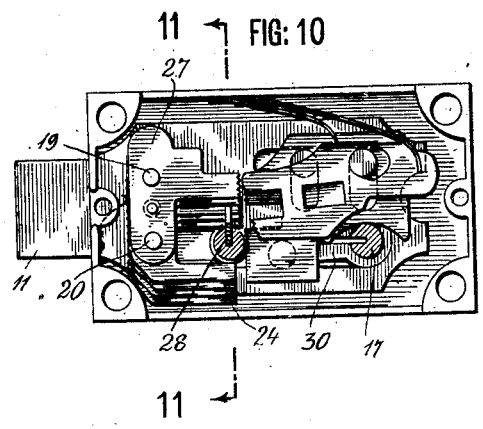
FIG: 10
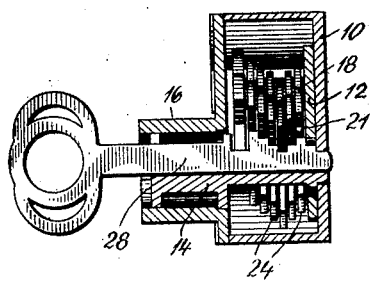
FIG: 11
Witnesses:
Max B. A. Doring
T. Newcomb
Inventor
Edwin J. Prindle,
By his Attorneys
Prindle and Williamson.

E. J. PRINDLE.
INTERCHANGEABLE KEY LOCK.
APPLICATION FILED JAN. 25, 1908.
972,241.
Patented Oct. 11, 1910.
3 SHEETS—SHEET 3.
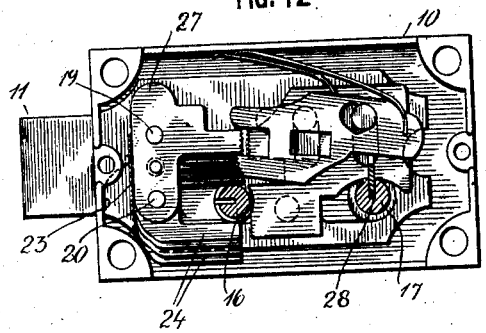
FIG: 12
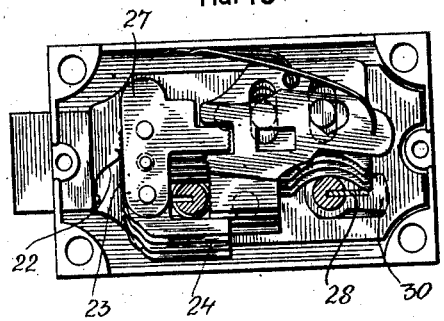
FIG: 13
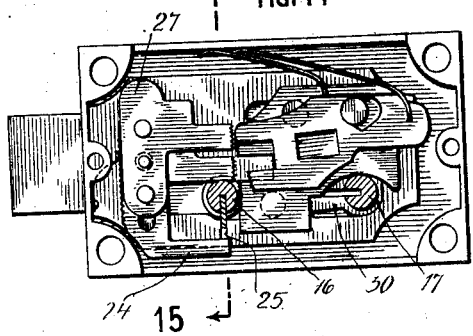
FIG: 14
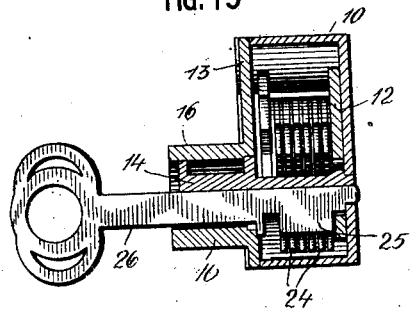
FIG: 15
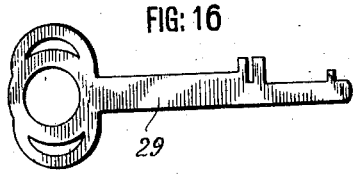
FIG: 16
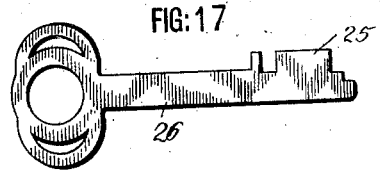
FIG: 17
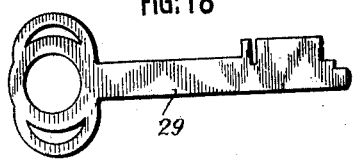
FIG: 18
Witnesses:
Inventor
Edwin J. Prindle.
By his Attorneys
Prindle and Williamson.
THE NORRIS PETERS CO., WASHINGTON, D. C.

UNITED STATES PATENT OFFICE.

EDWIN J. PRINDLE, OF NEW YORK, N. Y., ASSIGNOR TO HERRING-HALL-MARVIN SAFE COMPANY, OF HAMILTON, OHIO.

INTERCHANGEABLE-KEY LOCK.

972,241.

Specification of Letters Patent. Patented Oct. 11, 1910.

Application filed January 25, 1908. Serial No. 412,647.

*To all whom it may concern:*

Be it known that I, EDWIN J. PRINDLE, of New York, in the county of New York and State of New York, have invented a certain new and useful Improvement in Interchangeable-Key Locks, and do hereby declare that the following is a full, clear, and exact description thereof, reference being had to the accompanying drawings, in which—

Figure 1 is a front view of a lock embodying my invention; Fig. 2 is a rear view; Fig. 3 is a section on the line 3—3 of Fig. 1; Figs. 4 and 5 are respectively sections on the lines 4—4 and 5—5 of Fig. 1; Fig. 6 is a front view of the lock with the front plate removed and the parts in normal position; Fig. 7 is a view similar to Fig. 6 with the cover plate of the master tumbler removed; Fig. 8 is a front view of the lock with the master tumbler and its stump plate removed; Fig. 9 is a view of the lock casing with only the bolt in it; Fig. 10 is a view similar to Fig. 7 showing the depositor's key setting the stumps; Fig. 11 is a section on the line 11—11 of Fig. 10; Fig. 12 is a view similar to Fig. 10 but showing the master key operating its tumbler; Fig. 13 shows the lock opened by the depositor's key; Fig. 14 shows the lock restored to normal position and with the resetting key throwing the stump plates to their lowest positions; Fig. 15 is a cross section on the lines 15—15 of Fig. 14; Fig. 16 is a view of the master key; Fig. 17 is a view of the resetting key; and Fig. 18 is a view of a combined master key and resetting key.

The object of my invention has been to provide a lock of the type which is the subject of the application of Augustus W. Sibley, executed the 7th day of November, 1907, but with certain improvements which simplify its construction and operation; and to such ends my invention consists in the interchangeable key lock hereinafter specified.

Except in those respects hereinafter specified, the lock which is the subject of the present application is or may be the same as that which is the subject of the application of the said Augustus W. Sibley Serial No. 412,631, filed January 25th, 1908. In the lock upon which it is an improvement the stump plates are provided with springs which normally tend to throw the plates to their lowest positions and in opposition to the key which sets them. In the said lock there is provided a screw for clamping the stump plates in adjusted position. In the present lock it is not necessary to clamp the stump plates in adjusted position and that operation is entirely eliminated from the lock.

The present lock, like that upon which it is an improvement, consists of a box-like casing 10 in which is mounted a bolt consisting of a beveled head 11 and a bolt plate 12. The casing is closed by a cover 13, having cylindrical bosses 14 and 15, in which are mounted cylinders 16 and 17 respectively. The tumblers in the present lock are identical with those of the previous lock and will not be described in detail. The adjustable stump plates consist, Fig. 8, of plates 18 having a slot that is adapted to receive pins 19 and 20 secured upon the bolt plate 12, each plate carrying a stump 21. The stump plates are slidable upon the pins, but some form of friction is provided to yieldingly hold them in any given position. For instance, springs 22 may be secured to the bolt and bear upon teeth 23 formed on the forward edges of the stump plate. Obviously, other forms of friction could be provided. There are no springs tending to force the stump plates toward either end of the slots. The stump plates have arms 24 substantially parallel to the underside of the stumps, the said arms being adapted to be engaged by a web 25 formed on the resetting key 26, Figs. 15 and 17, when the resetting key is inserted in the slot of the key cylinder 16 and swings downward. This, as illustrated in Figs. 14 and 15, throws all of the movable stump plates to their lowest positions so that they are ready to be reset. The stump plate 27, Fig. 6, for the master tumbler, is not slotted, but is provided with holes to receive the pins 19 and 20, as such stump plate is not adjustable.

In the operation of the illustrated embodiment of my invention, the parts being in the position illustrated in Fig. 10, and it being desired to reset the lock for another key, the resetting key 26, Fig. 17, is inserted in the key cylinder 16, and its web swung downward to vertical position, as illustrated in Figs. 14 and 15. The web 25 in its movement engages the arms 24 on the stump plates, and moves all of the adjustable stump plates downward to their lowest positions, the movement being yieldingly opposed by the springs 22 engaging the roughened forward edges of the stump plates. The resetting key is now removed and the depositor's key is inserted in the key cylinder 16 and swung to the vertical position of Figs. 10 and 11. This movement carries the stump plates upward against the yielding resistance of the springs 22, the amount of upward movement of the respective stump plates being limited by the height of the steps in the web of the depositor's key 28. The stumps are now set to correspond with the key 28 and the lock is ready for use with the said key. Whenever it is desired to open the deposit box, the master key 29 is inserted in the key cylinder 17 and the master tumbler forced to the position shown in Fig. 12 as in the previous lock. The master key is then withdrawn, and some form of key guard applied to the key cylinder 16 to prevent such cylinder being turned in the absence of the customer. Such key guard may be in the form of a catch on the inside of the door, or a circular plate covering the key slot and having a stem extending through the key slot to the back of the door and there secured by a nut. The lock having been set, the depositor's key is inserted in the key cylinder 17 and swings to the vertical position illustrated in Fig. 11, thus raising the tumblers corresponding to the adjustable stumps to the proper levels so that their slots can receive the stumps, the further movement of the key and key cylinder carrying the bolt back by engagement of the lug 30 on the key cylinder with the slot 31 in the bolt plate, this movement being permitted by the entrance of the stumps into the slots of the tumblers. A movement of the depositor's key 28 in a forward direction locks the lock and disengages the stump plates from the tumblers, leaving the parts in the position illustrated in Fig. 10.

It is obvious that the foregoing lock is one of great simplicity considering what it accomplishes, and that it is very efficient. It is also obvious that various changes can be made in the above-illustrated construction which will be within the scope of my invention and I desire not to be limited beyond the requirements of the prior art and the terms of my claims. For instance, the web 25 of the resetting key, might, as illustrated in Fig. 18, be formed on the master key so that the lock would require but two keys, namely, the combined master and resetting key and the depositor's key.

I claim:—

1. In an interchangeable key lock, the combination of a series of stumps, means for yieldingly holding said stumps from movement when the lock is locked, means for resetting said stumps while the lock is locked, and a corresponding series of tumblers.

2. In an interchangeable key lock, the combination of a casing, a bolt, a series of stumps slidably mounted upon said bolt, means for yieldingly preventing movement of said stumps while the lock is locked, a key-cylinder key engaging surfaces on said stumps to operate said stumps while the lock is locked, and a corresponding series of tumblers.

3. In an interchangeable key lock, the combination of a casing, a bolt, a series of stumps slidably mounted upon said bolt, means for yieldingly opposing the movement of said stumps, and a key cylinder, said stumps having substantially parallel edges adapted to be engaged, the one edge by a resetting key and the other edge by a lock operating key, and a corresponding series of tumblers.

4. In an interchangeable key lock, the combination of a casing, a bolt, a series of stumps slidably mounted upon said bolt, means for yieldingly opposing the sliding of said stumps when the lock is locked, a corresponding series of tumblers, and means whereby both said stumps and said tumblers may be each directly engaged and operated by a key.

5. In an interchangeable key lock, the combination of a casing, a bolt, a series of stumps slidably mounted upon said bolt, springs bearing against said stumps to yieldingly oppose their movement, a key cylinder coöperating with said stumps, key engaging edges upon said stumps on opposite sides of said key cylinder, a corresponding series of tumblers, and a key cylinder coöperating with said tumblers.

In testimony that I claim the foregoing I have hereunto set my hand.

EDWIN J. PRINDLE.

Witnesses:
A. NEWCOMB,
M. REINERS.